Jan. 15, 1935.　　　M. J. BALDWIN　　　1,988,106
METHOD OF MAKING ILLUSTRATIONS
Filed July 3, 1931　　2 Sheets-Sheet 1

INVENTOR
MINOT J. BALDWIN
BY Ely Barrow
ATTORNEYS

Patented Jan. 15, 1935

1,988,106

UNITED STATES PATENT OFFICE 1,988,106

METHOD OF MAKING ILLUSTRATIONS

Minot J. Baldwin, Akron, Ohio

Application July 3, 1931, Serial No. 548,698

1 Claim. (Cl. 95—5)

This invention relates to methods and apparatus for making illustrations, and more especially it relates to improved procedure and apparatus for making perspective drawings of articles of complex design.

An illustrative example of the utility of the invention is the preparation of illustrations of pneumatic or cushion tires for vehicles, to be used for advertising purposes. Photographs of tires, when taken at close proximity to bring out details of design, so distort other portions of the article as to render the pictures undesirable if not actually deceptive. Moreover it is frequently necessary to prepare an illustration of a proposed tire even before the tire is actually constructed. By illustrating a tire with drawings instead of photographs, the salient or novel features of the tire may be accentuated or exaggerated, whereby a more useful and attractive illustration is provided.

The chief objects of the invention are to facilitate the illustrating of articles of complex design; to save time and labor in the making of illustrative drawings; to effect accuracy of proportion in perspective drawings; to facilitate the production of accentuated or exaggerated illustrations; and to provide an improved method and improved apparatus for attaining the foregoing objects.

Of the accompanying drawings.

Figure 1:
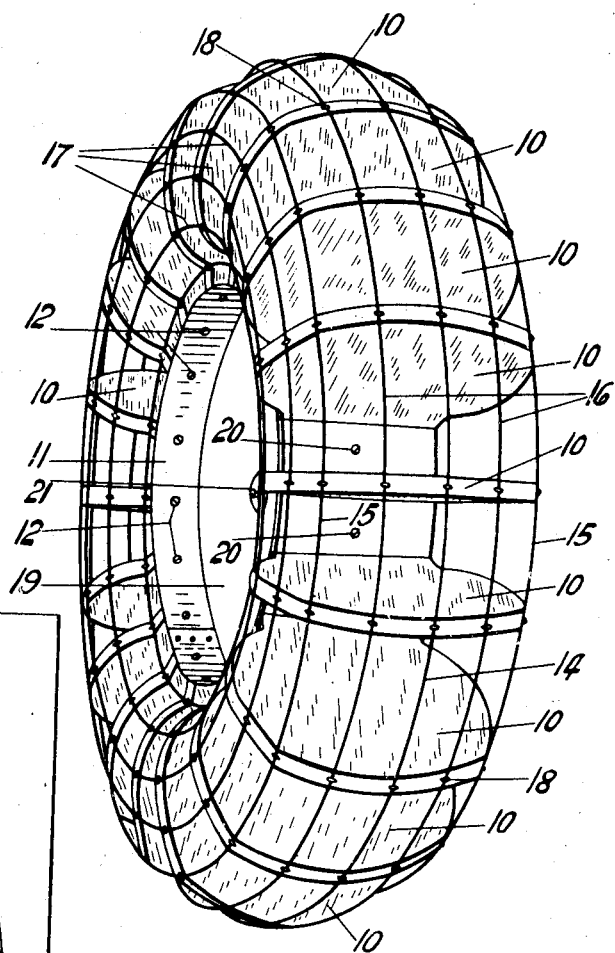
Figure 1 is a perspective view of apparatus embodying the invention and adapted for use in the practice thereof.

Referring to the drawings, the apparatus shown in Figure 1 is a skeleton form comprising a circumferential series of wooden plates 10, 10, which plates have the same profile as the cross-sectional profile of a tire to be illustrated. As hereinbefore stated, the illustration is designed to accentuate or exaggerate certain features of a tire, and for this reason the plates 10 preferably have a wider tread portion and a wider base portion than the actual tire that is to be illustrated.

The wooden plates 10 are secured to an annular metal hoop or ring 11 by screws 12, 12 which are threaded into their base portions, the plates being radially disposed with relation to the hoop and spaced substantially equidistant about the outer periphery thereof. The diameter of the hoop 11 is somewhat smaller than the bead diameter of the tire to be illustrated, and the height of the plate 10 is such that the outside diameter of the assembled structure may be substantially the same as the outside diameter of the tire to be illustrated, the arrangement being such that the form represents a tire of relatively small bead diameter as compared to pneumatic tires of standard proportions.

Mounted upon the plates 10 and extending circumferentially of the form are a plurality of wire rings of which the wire 14 is in the central plane of the form at the outer periphery thereof, wires 15, 15 are at that portion of the form corresponding to the lateral margins of a tire tread, wires 16, 16 are between wire 14 and wires 15, and wires 17, 17 are on at least one side of the form corresponding to a side wall of a tire. The said wires are secured to the plates 10 by staples 18 or any other suitable means, and intersect exactly corresponding points on each plate.

Mounted within the hoop or ring 11 is a wooden disc 19 that may be secured thereto by screws 20, and said disc may be formed with an axial aperture 21 to provide a finger grip by which the form conveniently may be handled. The disc 19 is spaced from at least one lateral margin of the hoop 11 a distance equal to the width of the bead of the tire to be shown in the illustration, which bead width is somewhat greater than the bead width of a standard tire of the same outside diameter as the form.

Figure 2:
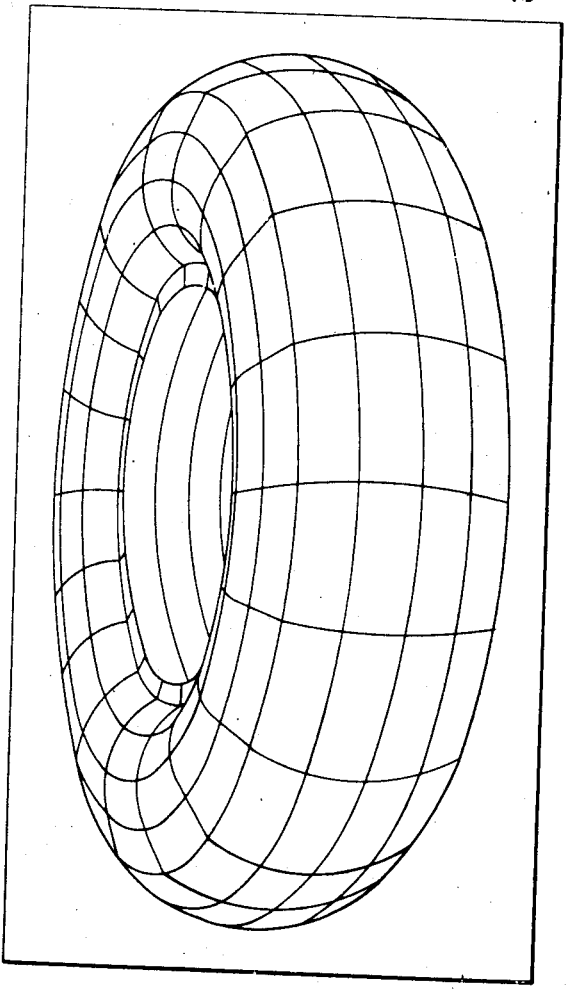
Figure 2 is a master pattern made from a photograph of the apparatus shown in Figure 1.

In the practice of the improved method of illustrating with the apparatus described, the first step is to photograph the skeleton form, which may be from any angle desired, but usually is the three-quarter front view shown in Figure 1. The photograph is printed on suitable paper, and of suitable size to permit conveniently for retouching. The retouching is done with ink, and consists of outlining the wires 14 to 17, at least one of the near edges of the plates 10, the margin of the hoop 11, and the corner at the juncture of the hoop and the disc 19. A line parallel to the last mentioned line is added at a distance therefrom corresponding to distance between the beads of the tire to be illustrated. The retouching being completed, the original photograph is bleached out, leaving only the ink lines. The print thus produced is then photographed, the negative of the photograph constituting what may be called a master pattern and which shows the design illustrated in Figure 2.

Figure 3:
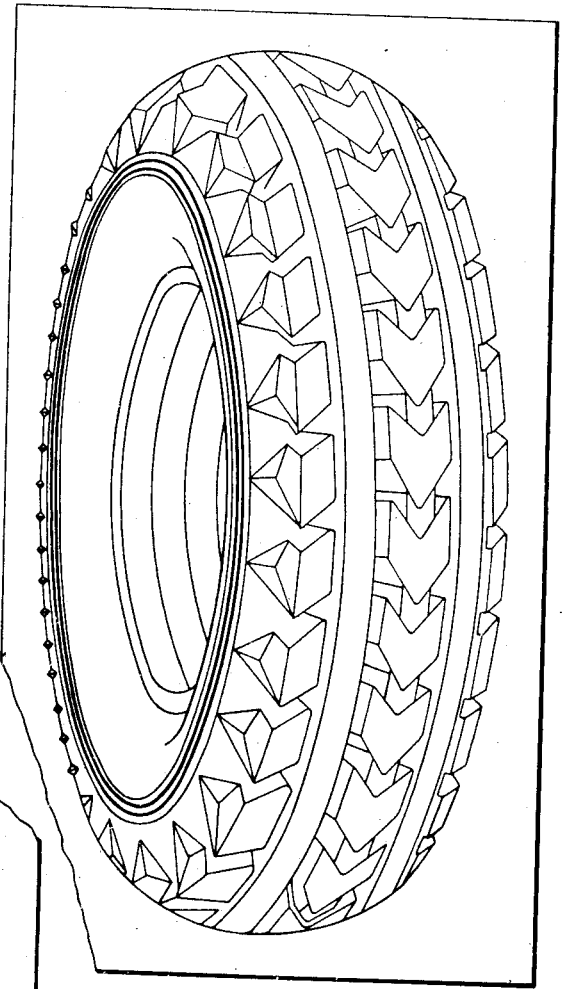
Figure 3 is a line drawing of a pneumatic tire casing made with the aid of the master pattern shown in Figure 2.

From the master pattern may be made as many prints as desired, and of any size required, the prints preferably being made very light so that the lines therein readily may be obscured by subsequent treatment of the print, or will disappear when the finished drawing is reduced in size. The print from the master pattern constitutes an outline or guide upon which is made a line drawing of a tire, substantially as shown in Figure 3. In some cases the circumferential lines of the tire are coincident with the circumferential lines of the print, and in some cases they are not, it being a simple matter in the latter case to draw the lines of the tire parallel to those of the print. Since the lines of the print defining the cross-sectional profile of the tire are equally spaced, it is a simple matter accurately to fill in the tread design of the tire so that the characters thereof are uniformly arranged in correct perspective circumferentially of the tire. Usually the artist draws in fewer tread characters in the illustration than are present in the actual tire and thus more clearly shows the distinctive characteristics of the tread design as well as giving it a more rugged and sturdy appearance.

Figure 4:
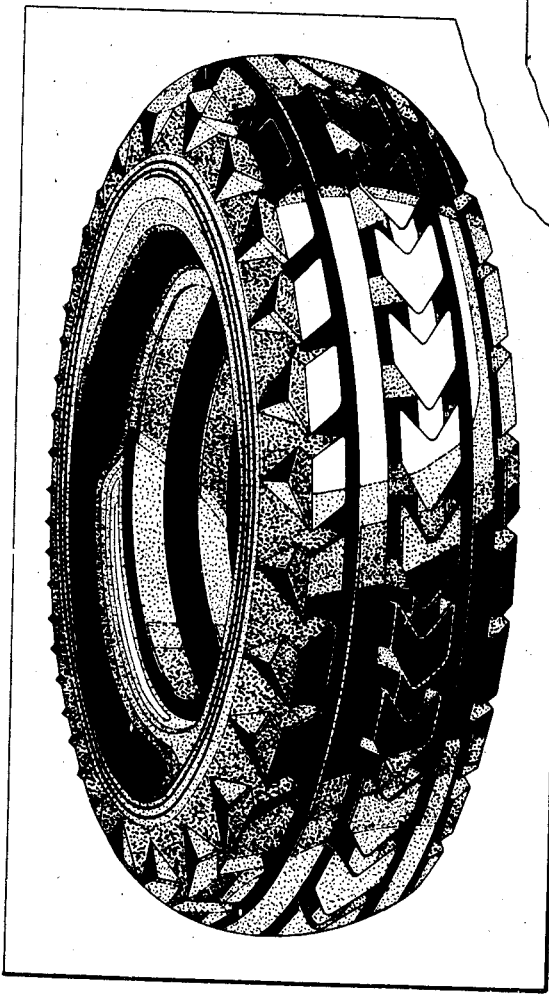
Figure 4 is the finished illustration of a tire casing made by shading the line drawing shown in Figure 3.

The line drawing is then shaded to complete the illustration, and the shading may be line shading or it may be a wash. The latter method is used in the illustration shown in Figure 4, which appears in its completed form.

The invention results in the rapid and economical production of illustrations, which illustrations more clearly depict the article than would an actual photograph thereof. After the master pattern is prepared an innumerable number of prints may be made therefrom, and in the event that it is desired to illustrate the article from a different angle a new master pattern readily may be made by photographing the skeleton form from the desired angle.

Modifications of the invention may be resorted to without departing from the spirit of the invention or the scope of the appended claim which is not limited wholly to the specific apparatus shown or exact procedure described.

What is claimed is:—

The method of illustrating tires which comprises constructing a form of general tire shape but with exaggerated proportions as compared to the tire to be illustrated, indicating on said form certain transverse and circumferential profile lines, photographing the form, and then altering the photograph by inking or otherwise working over some of the lines appearing thereon and adding other lines thereto.

MINOT J. BALDWIN.